(12) United States Patent
Huber et al.

(10) Patent No.: US 10,525,944 B2
(45) Date of Patent: Jan. 7, 2020

(54) VEHICLE DEVICE WITH POWER-SAVING OPERATION OF A SIGNAL INPUT APPARATUS

(71) Applicant: KNORR-BREMSE Systeme fuer Nutzfahrzeuge GmbH, Munich (DE)

(72) Inventors: Christoph Huber, Munich (DE); Christian Kraemer, Knittlingen (DE); Matthias Roth, Ditzingen (DE); Dieter Benad, Koenigsbrueck (DE); Markus Eissner, Eschenbach (DE); Michael Rimpel, Schwieberdingen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 157 days.

(21) Appl. No.: 15/462,988

(22) Filed: Mar. 20, 2017

(65) Prior Publication Data
US 2017/0190324 A1    Jul. 6, 2017

Related U.S. Application Data

(63) Continuation of application No. PCT/EP2015/069198, filed on Aug. 21, 2015.

(30) Foreign Application Priority Data

Sep. 19, 2014    (DE) .......................... 10 2014 013 942

(51) Int. Cl.
*B60T 7/04*    (2006.01)
*B60T 13/68*    (2006.01)
(Continued)

(52) U.S. Cl.
CPC ............ *B60T 7/042* (2013.01); *B60T 13/683* (2013.01); *B60T 15/043* (2013.01); *B60T 15/14* (2013.01);
(Continued)

(58) Field of Classification Search
CPC .............. B60T 7/042; B60T 2270/403; B60T 2260/08; B60T 2220/04; B60T 15/14;
(Continued)

(56) References Cited

U.S. PATENT DOCUMENTS 5,427,442 A    6/1995    Heibel
7,123,002 B2    10/2006    Lohberg et al.
(Continued)

FOREIGN PATENT DOCUMENTS

CN    1994793 A    7/2007
DE    43 09 850 A1    9/1994
(Continued)

OTHER PUBLICATIONS

International Preliminary Report on Patentability (PCT/IB/326, PCT/IB/338 & PCT/IB/373) issued in PCT Application No. PCT/EP2015/069198 dated Mar. 30, 2017, including English translation of document C2 (German-language Written Opinion (PCT/ISA/237)) previously filed on Mar. 20, 2017 (eight pages).
(Continued)

*Primary Examiner* — Hunter B Lonsberry
*Assistant Examiner* — Mathew Franklin Gordon
(74) *Attorney, Agent, or Firm* — Crowell & Moring LLP

(57) ABSTRACT

A vehicle brake system device is provided. The vehicle brake system device includes having a signal input apparatus for inputting request signals from a driver of the vehicle which includes a sensor device which gradually detects a degree of operation of a driver-operated operating element between a position which represents non-operation and a position which represents maximum operation, and generates an operating signal which represents this degree of operation. The signal input apparatus also includes an evaluation electronics system into which the sensor device operating signal is introduced for evaluation purposes. In a
(Continued)

switched-off state of a vehicle ignition system the sensor device and/or the evaluation electronics system cyclically assume either a standby mode with reduced electrical energy consumption from an electrical energy source in comparison to an operating mode which prevails in the switched-on state of the vehicle ignition system, the reduced energy consumption is an energy consumption level insufficient to ensure operation of the sensor device and/or the evaluation electronics system for detecting and evaluating operation of the operating element as intended, or assume an energy-saving operating mode which ensures operation of the sensor device and/or of the evaluation electronics system to detect and evaluate operation of the operating element.

19 Claims, 3 Drawing Sheets

(51) Int. Cl.
*B60T 15/04* (2006.01)
*B60T 15/14* (2006.01)
*G05G 1/30* (2008.04)

(52) U.S. Cl.
CPC ............ *G05G 1/30* (2013.01); *B60T 2220/04* (2013.01); *B60T 2260/08* (2013.01); *B60T 2270/403* (2013.01)

(58) Field of Classification Search
CPC .... B60T 15/045; B60T 15/043; B60T 13/686; B60T 13/683; B60T 7/12; B60T 7/107; B60T 7/085; B60T 7/065; G05G 1/30
See application file for complete search history.

(56) References Cited

U.S. PATENT DOCUMENTS

| | | | |
|---|---|---|---|
| 7,321,214 B2 | 1/2008 | Kobayashi et al. | |
| 7,821,154 B2 | 10/2010 | Hilberer | |
| 2002/0078390 A1 | 6/2002 | Sumida | |
| 2003/0183024 A1 | 10/2003 | Lohberg et al. | |
| 2004/0162657 A1 | 8/2004 | Ishida | |
| 2007/0035896 A1 | 2/2007 | Kobayashi et al. | |
| 2007/0152500 A1 | 7/2007 | Wakabayashi et al. | |
| 2009/0134701 A1 | 5/2009 | Bolz | |
| 2009/0138137 A1* | 5/2009 | Iwagami .................. G05B 9/02 701/1 |
| 2009/0206658 A1 | 8/2009 | Hilberer | |
| 2011/0015820 A1 | 1/2011 | Asahara | |
| 2014/0232178 A1 | 8/2014 | Claussen et al. | |
| 2014/0244126 A1* | 8/2014 | Lee ........................... B60T 7/12 701/70 |
| 2016/0009263 A1* | 1/2016 | Feigel ..................... B60T 8/321 303/15 |

FOREIGN PATENT DOCUMENTS

| | | |
|---|---|---|
| DE | 44 00 688 A1 | 2/1995 |
| DE | 10 2004 003 156 A1 | 7/2004 |
| DE | 10 2004 027 541 A1 | 12/2004 |
| DE | 10 2006 032 338 A1 | 2/2007 |
| DE | 10 2006 051 354 A1 | 5/2007 |
| DE | 10 2007 003 424 A1 | 7/2008 |
| DE | 10 2008 064 049 A1 | 1/2010 |
| DE | 10 2011 116 902 A1 | 4/2013 |
| EP | 0 708 722 B1 | 10/1997 |
| EP | 2 648 947 B1 | 2/2015 |
| WO | WO 02/09989 A1 | 2/2002 |
| WO | WO 2007/028579 A1 | 3/2007 |
| WO | WO 2012/076514 A1 | 6/2012 |

OTHER PUBLICATIONS

Chinese-language Office Action issued in counterpart Chinese Application No. 201580062546.2 dated Oct. 19, 2018 with English translation (11 pages).

* cited by examiner

VEHICLE DEVICE WITH POWER-SAVING OPERATION OF A SIGNAL INPUT APPARATUS

CROSS REFERENCE TO RELATED APPLICATIONS

This application is a continuation of PCT International Application No. PCT/EP2015/069198, filed Aug. 21, 2015, which claims priority under 35 U.S.C. § 119 from German Patent Application No. 10 2014 013 942.5, filed Sep. 19, 2014, the entire disclosures of which are herein expressly incorporated by reference.

BACKGROUND AND SUMMARY OF THE INVENTION

The present invention relates to vehicle brake control systems, and in particular to brake system devices with greater availability and/or functionality.

The invention is based on a vehicle device having a signal input device for inputting request signals of a driver of the vehicle. The signal input device contains a sensor device which gradually senses a degree of activation of a driver-activated activation element between a position which represents non-activation and a position which represents maximum activation, and generates an activation signal which represents this degree of activation. The signal input device also contains evaluation electronics, into which the activation signal which is generated by the sensor device is input for the purpose of evaluation.

A signal input device in the form of a service brake valve for an electro-pneumatic service brake device as a vehicle device is known from International patent documents no. WO 2012/076514 A1.

In electro-pneumatic brake devices of modern utility vehicles there is generally a superordinate electro-pneumatic service brake circuit present which is assigned an electrical channel of the electro-pneumatic service brake valve or foot-operated brake module (FBM), i.e. when a service brake activation element (foot-operated brake pedal) of the service brake valve is activated, a sensor device generates an electrical activation signal as a function of the activation travel or activation angle corresponding to the braking request, which activation signal is input into evaluation electronics for signal conditioning. The conditioned activation signal is then input into a central electronic brake control unit in order to input a brake pressure, corresponding to the braking request into pneumatic service brake cylinders by corresponding activation of solenoid valves or pressure regulating modules.

In parallel with this, the activation of the foot-operated brake pedal of the service brake valve causes a plunger piston which is connected to the foot-operated brake pedal to activate, via a compression spring, a relay piston which in turn controls a double-seat valve of the service brake valve in order to generate a pneumatic control pressure, corresponding to the braking request. The pneumatic control pressure is applied to pneumatic channels of the service brake valve which form, via subordinate pneumatic service brake circuits, a brake pressure in the brake cylinders if the superordinate electrical service brake circuit has failed owing to a defect.

In the electro-pneumatic service brake valve or foot-operated brake module which is known, for example, from WO 2012/076514 A1 and is used to detect a service brake pedal position, a plunger which is operatively connected to the service brake pedal projects into a recess in the plunger piston which is connected to a spring plate which activates the relay piston by means of said compression spring. The foot-operated brake module contains a sensor device in the form of, for example, contactless travel measuring sensors with which the driver's service brake request and therefore the position of the foot-operated service brake pedal can be detected and evaluated in evaluation electronics. The sensor device or these evaluation electronics is/are not supplied with electrical energy when the vehicle ignition is switched off, and in this state can therefore not be used either for general detection of activation of the foot-operated service brake pedal or for detecting its degree of activation between a position which represents non-activation and a position which represents maximum activation.

In an electro-pneumatic service brake device described above with a superordinate electro-pneumatic service brake circuit and downstream pneumatic service brake circuits, legislators require that two brake circuits always respond if the driver activates the foot-operated service brake pedal. This must be the case even if a vehicle which is equipped with such a service brake device rolls downhill when the vehicle ignition is switched off.

In order, nevertheless, to ensure that the sensor device and the evaluation electronics are supplied with electrical energy when the vehicle ignition is switched off and the foot-operated service brake pedal is activated, in the foot-operated brake module known from WO 2012/076514 A1 an electronic circuit is proposed in combination with a microswitch which is activated by the relay piston. When the vehicle ignition is switched off, activation of the foot-operated service brake pedal is then detected and sensed via this microswitch and the electronic switch. A microswitch is understood here to be an electrical switch whose contacts are a distance of less than 3 mm from one another in the opened state. A known design is, for example, a microswitch with a snap-action system. Furthermore, designs as a normally-closed switch and a normally-open switch and as a change-over switch with the three contacts of a normally-closed contact, normally-open contact and switching tongue are also known. The switch state of the microswitch arises through contact with the relay piston in the foot-operated brake module. Through sufficient activation of the brake pedal, the relay piston is moved downward to such an extent that the microswitch changes its switch state.

The known foot-operated brake module therefore contains two independent sensing systems, specifically the travel measuring sensor or sensors with assigned evaluation electronics and the microswitch with assigned electronic circuit, wherein the microswitch merely activates or does not activate the states, and the travel measuring sensor can detect the degree of activation of the foot-operated service brake pedal.

However, such a microswitch always contains a mechanical contact. This contact is subject to certain mechanical stressing over the service life of the foot-operated brake module. This includes disadvantages such as, for example, wear of the microswitch mechanics, failure of the switching function as a result of external soiling, corrosion of the switching contacts of the microswitch, necessary sealing of the microswitch with respect to environmental influences (water, grease), freezing of the switching mechanics in the case of temperatures below zero and moisture, expenditure on mounting and formation of contacts for the microswitch and/or wear of the contact-forming element on the microswitch (contact pin).

In addition to the electro-pneumatic service brake device described above, in a modern vehicle there are further electrical, electro-pneumatic or electro-hydraulic vehicle devices, in which a signal input device is provided for inputting request signals of a driver of the vehicle with respect to the vehicle device, which signal input device contains a sensor device which gradually senses a degree of activation of an activation element, which can be activated by the driver, of the signal input device between a position which represents non-activation and a position which represents maximum activation, and generates an activation signal which represents this degree of activation, as well as evaluation electronics, into which the activation signal which is generated by the sensor device is input for the purpose of evaluation.

Such a vehicle device comprises, in particular, a parking brake device with a hand-operated or foot-operated device as a single input device as well as a foot pedal or a hand-operated activation element as an activation element, a clutch device with a clutch pedal-operated device as a signal input device and having a clutch foot pedal as an activation element or an accelerator pedal device having an accelerator pedal-operated device as a signal input device as well as having an accelerator foot pedal as an activation element.

The present invention is therefore based on the object of providing a vehicle device which has a higher level of availability or greater functionality with low additional expenditure.

Using the example of an electrical or electro-pneumatic service brake device as a vehicle device, the degree of activation of the foot-operated service brake pedal when the vehicle ignition is switched on is determined by the sensor device (e.g. contactless inductive travel measuring sensor), and transferred to a central brake control unit of the service brake device after evaluation by the evaluation electronics. This then results in the implementation of the deceleration requested by the driver in the brake actuators which are controlled electrically by the brake control unit.

In order to be able to sense activation of the foot-operated service brake pedal (gradually also in relation to the respective degree of activation) when the vehicle ignition is switched off, the invention provides that the sensor device and/or the evaluation electronics are designed to assume, in the switched-off state of the vehicle ignition system, a standby mode with reduced electrical energy consumption from an electrical energy source in comparison with an operating mode which prevails in the switched-on ignition. The energy consumption is not sufficient to ensure intended operation of the sensor device and/or of the evaluation electronics in the form of the sensing and evaluation of activation of the activation element, but to be moved in cycles into an energy-saving operating mode which ensures the intended operation of the sensor device and/or of the evaluation electronics in the form of the sensing and evaluation of activation of the activation element.

In other words, even in the switched-off state of the vehicle ignition system the sensor device and/or the evaluation electronics are not decoupled from an electrical energy supply but instead continue to be supplied thereby with electrical energy and additionally placed in a standby mode which is usually present with commercially available microprocessors for evaluation electronics, in which standby mode a significantly lower consumption of electrical energy prevails than in the operating mode which is present when the ignition is switched on.

However, in the standby mode which is present between the cyclic increased periods of consumption of electrical energy, the energy consumption is so low that intended operation of the sensor device and/or of the evaluation electronics in the form of the sensing and evaluation of activation of the activation element is not possible. Therefore, the energy consumption of the sensor device and/or of the evaluation electronics is increased in cycles and only during a relatively short time period within the scope of the energy-saving operating mode, in order to permit the intended operation of the sensor device and/or of the evaluation electronics in the form of the sensing and evaluation of activation of the activation element during such a time period.

Therefore, a changeover between the standby mode and the energy-saving operating mode of the sensor device and/or of the evaluation electronics takes place continuously within the scope of the cycle, and to be more precise at an interval from its period T. This cycle or the period of this cycle or the time period of the energy-saving operating mode is dimensioned here in such a way that activation of the activation element can be sensed in any case, even if there is a slight delay. The maximum delay of the sensing and evaluation of the signal is then just one time the period of a cycle. In other words, a type of pulsed sensing and evaluation of the signals of the sensor device is therefore implemented.

Compared to continuously occurring sensing and evaluation of the signals of the sensor device by the evaluation device in the operating mode when the vehicle ignition is switched on, these functions occur within the scope of the invention in a shorter period of time, and therefore more quickly, when the vehicle ignition is switched off, but given corresponding adaptation of the parameters which are decisive for the process this is sufficient to ensure reliable sensing and evaluation with sufficient accuracy.

Therefore, the invention makes use of an already existing sensor device/evaluation electronics combination with which, when the vehicle ignition is switched on, a degree of activation of the activation element is detected gradually, preferably for such a purpose also when the ignition is switched off, but with highly reduced consumption of electrical energy. Therefore, it is possible to dispense with a microswitch of the prior art as an additional sensing system.

Instead of sensing and evaluating the degree of activation of the activation element, it lies within the scope of the invention if during the energy-saving operating mode it was also merely sensed whether the activation element was generally activated or not (binary signal). This is also to be subsumed under intended operation.

If, in particular, the sensor device senses the degree of activation of the activation element in a contactless fashion, the disadvantages described at the beginning with respect to mechanical wear, environmental influences, assembly etc. are also eliminated.

The consumption of electrical energy in the energy-saving operating mode can be decreased compared to the consumption in the operating mode by a series of measures. For this purpose it is possible, in particular, to reduce the time period of the cyclically activated energy-saving operating mode to a time period which is just still sufficient to sense and evaluate activation of the activation element, but there is no restriction to this.

Furthermore, the evaluation electronics and/or the sensor device can be supplied by a device of the vehicle, e.g. by another electronic control device, which is supplied with current by the electrical energy source of the vehicle, with a voltage value, e.g. with 5 V, which is lower than the voltage value of e.g. 24 V which is supplied by the electrical energy source.

In particular, it is possible to use a voltage regulator or voltage transformer which supplies the sensor device and/or the evaluation electronics with a voltage value which is lower compared to a voltage value of the electrical energy source of the vehicle.

A preferred measure can also be to disconnect, from the electrical energy supply, circuit parts of the evaluation electronics which are not required, at least during the energy-saving operating mode.

Furthermore, energy-saving operating modes of a microcontroller of the evaluation electronics which are also already present can be used during the standby mode to reduce the energy consumption, for example by switching off peripherals, switching off the quartz, switching off the bus clock etc.).

As a result of the measures according to the invention, the actual energy consumption of electrical energy is obtained as an average value composed of very low electrical energy consumed during the cycles in the standby mode and of the relatively large amount of energy consumed during the pulse-like and brief cycles in the energy-saving operating mode, wherein this average value can be adapted by changing the ratio between the time period in the standby mode and the time period in the energy-saving operating mode. The level of consumed current during the energy-saving operating mode also plays a role here.

In the switched-off state of the vehicle ignition system and in the energy-saving operating mode, the electrical energy which is consumed by the sensor device and/or the evaluation electronics is particularly preferably lower than in the operating mode when the vehicle ignition system is in the switched-on state. This also contributes to a saving in electrical energy in the energy-saving operating mode, with the result that the risk of discharging of the on-board battery is reduced in the energy-saving operating mode.

Therefore, preferably three consumption levels of electrical energy are provided, wherein the lowest consumption level is in the standby mode when the vehicle ignition is switched off, the next highest consumption level is in the energy-saving operating mode, also when the vehicle ignition is switched off, and the highest consumption level is in the operating mode when the vehicle ignition is switched on.

According to one development, the sensor device senses the activation of a component which is directly or indirectly activated by the activation element, wherein the sensing with respect to this component is contactless or involves contacts, wherein contactless sensing is to be preferred for the reasons specified above.

In particular, a generator is provided which generates, in the cycles or cyclically, an event signal which causes the evaluation electronics and/or the sensor device to exit the standby mode and assume the energy-saving operating mode. In this context, the energy-saving operating mode is preferably assumed for a shorter time period $t_1$ compared to the time period $t_0$ in which the standby mode prevails, or for a time period $t_1$ which is at least as long as the time period $t_0$ of the standby mode.

When the vehicle ignition system is switched off and further electronic components of the vehicle device are in the standby mode, and therefore cannot trigger the cycle in which the sensor device and/or the vehicle evaluation electronics is/are adjusted cyclically from the standby mode into the energy-saving operating mode and back again, this cycle is therefore preferably triggered in an event-controlled fashion, for example by a counter signal or timer signal as an event signal of a generator. As a result, with the exception of the generator, the further electronics can "go to sleep" during the standby mode, with the result that in the standby mode additional electrical energy has to be made available only for the generator. The loading or discharging of the vehicle battery is reduced to a minimum in this way.

According to one development of these measures, the generator is integrated into the evaluation electronics. However, because the sensor sensing device of the vehicle device is in any case supplied continuously with electrical energy and the evaluation electronics are used, after sensing of activation of the activation element, to "wakeup" further electronic components of the vehicle device, i.e. to adjust them from the standby mode into the operating mode, it is advantageous to integrate the generator into the evaluation electronics of the sensor sensing device. However, as an alternative to this, the generator could also constitute a separate unit or else be integrated in another electronic component of the vehicle device.

Furthermore, the generator can be freely programmable with respect to a period T of the cycles of the event signal, the time period $t_1$ during which the energy-saving operating mode is assumed, and/or the time period $t_0$ during which the standby mode is assumed. In addition, the generator can be designed in such a way that it can be calibrated cyclically by a reference time measuring source.

According to one particularly preferred measure, the evaluation electronics communicates with at least one electronic open-loop or closed-loop control device of the vehicle system and is designed in such a way that when activation of the activation element in the energy-saving operating mode is sensed a wakeup signal is generated for the at least one electronic open-loop or closed-loop control device of the vehicle system, in order to place the device in its operating mode even when the ignition is switched off. Therefore, for example the entire vehicle device can then be employed for the intended use, e.g. for service braking operations and/or parking braking operations.

For this purpose, the evaluation electronics can communicate with the at least one electronic open-loop or closed-loop control device for the vehicle device by means of a data bus.

The evaluation electronics of the signal input device preferably have at least one microprocessor.

According to one development, the evaluation electronics of the signal input device have at least two microprocessors, only a first microprocessor of which is placed cyclically in the standby mode and in the energy-saving operating mode in the switched-off state of the vehicle ignition system, while in the switched-off state of the vehicle ignition system at least one further microcontroller of the evaluation electronics is completely deactivated and not placed in operation until when the ignition is switched on. Because just a single microprocessor of the at least two microprocessors is operated in the standby mode and also cyclically in the energy-saving operating mode, the energy consumption in these modes is low.

In this context, this first microcontroller of the evaluation electronics already has, from the time of manufacture, a standby mode in which the energy consumption is particularly low.

The vehicle device can be any vehicle device with the above features, in particular an electrical, electro-pneumatic or electro-hydraulic vehicle device having a signal input device for inputting request signals of a driver of the vehicle with respect to the vehicle device, which signal input device contains a sensor device which gradually senses a degree of activation of an activation element, which can be activated by the driver, of the signal input device between a position which represents non-activation and a position which represents maximum activation, and generates an activation signal which represents this degree of activation, as well as evaluation electronics, into which the activation signal which is generated by the sensor device is input for the purpose of evaluation.

In particular, the vehicle device is an electro-pneumatic or electrical service brake device of a vehicle having at least one electrical or electro-pneumatic service brake circuit, containing a service brake pedal device as a signal input device with a foot-operated service brake pedal as an activation element and at least one electrical channel which contains the sensor device and the evaluation electronics, wherein the sensor device directly or indirectly senses activation travel and/or an activation angle of the foot-operated service brake pedal.

Alternatively, the vehicle device can also be a parking brake device with a hand-operated or foot-operated device as a signal input device as well as a foot pedal or a hand-operated activation element as an activation element, a clutch device with a clutch pedal-operated device as a signal input device and having a clutch foot pedal as an activation element or an accelerator pedal device having an accelerator pedal-operated device as a signal input device as well as having an accelerator foot pedal as an activation element.

In summary, a (programmable) event signal of a generator is therefore used to exit the standby mode cyclically and assume the energy-saving operating mode. In addition, the sensing time of the sensor device is preferably shortened in the energy-saving operating mode. Furthermore, cyclical calibration of the event signal generator preferably takes place with respect to a more precise time source in order to correct fabrication-induced and/or ambient-temperature-induced deviations and/or a change in the ambient temperature.

It is advantageous overall that activation of the activation element can be sensed with only a short temporal delay by pulsed sensing of the sensor signal which is achieved using the measures above. The actual consumption of current is then obtained by forming mean values, i.e. averaging over the low consumption of current during the standby mode and a very brief and higher consumption of current compared thereto during the sensing time. By changing the period of the cycle, the average consumption of current can then be adapted to the electrical energy source which is respectively present in the vehicle.

The invention also relates to a vehicle having a vehicle device as described above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
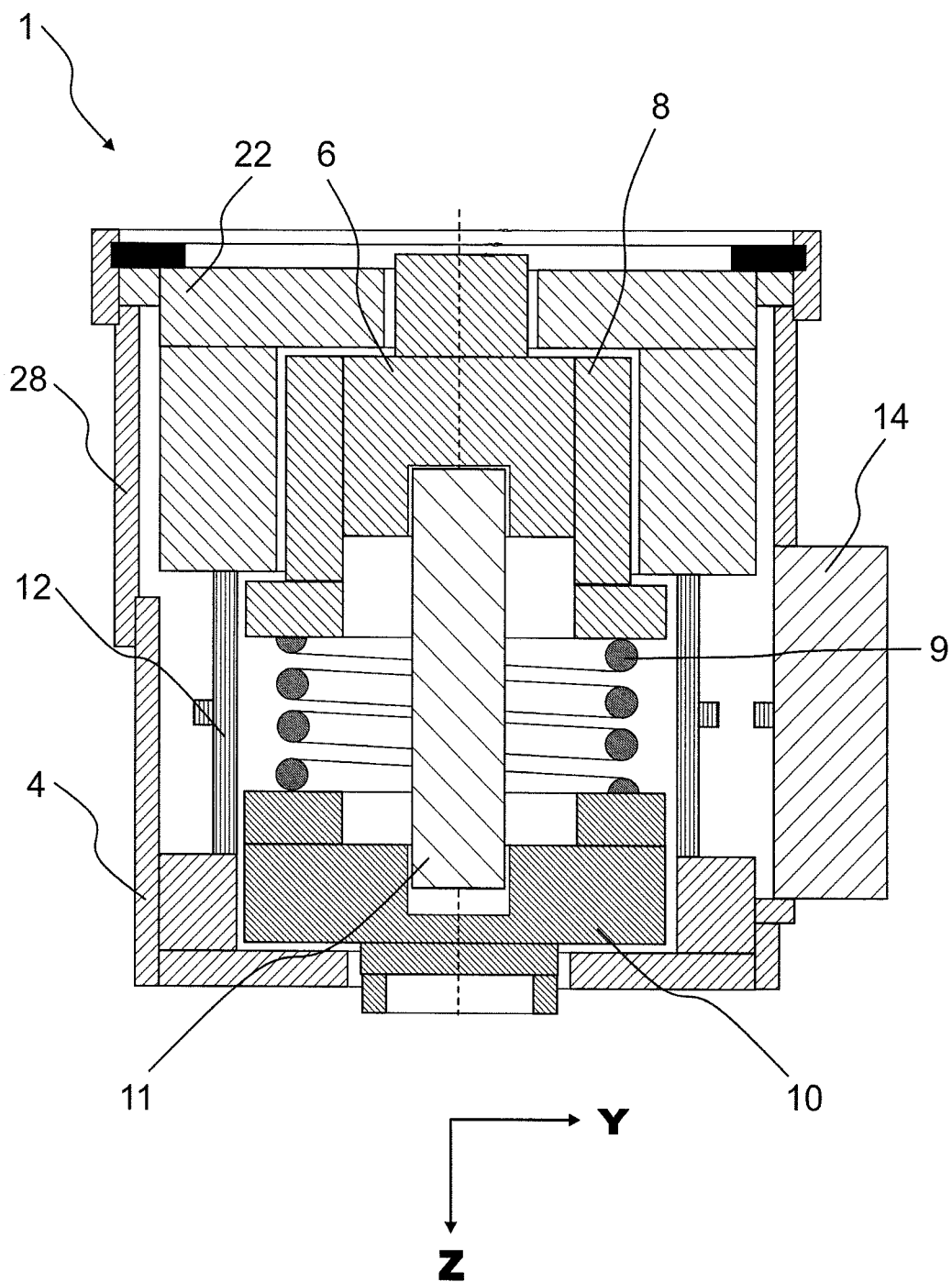
FIG. 1 shows a schematic and simplified longitudinal section through an upper part of a foot-operated brake module or electro-pneumatic service brake valve of an electro-pneumatic service brake device in an embodiment of a vehicle device according to the invention.

The upper part of an electro-pneumatic service brake valve or foot-operated brake module 1 shown in FIG. 1 is a component of an electro-pneumatic brake device of a utility vehicle in an embodiment of a vehicle device according to the invention. The electro-pneumatic service brake device has, for example, an electrical brake circuit and two pneumatic service brake circuits. For the sake of simplification, just a single pneumatic service brake circuit is assumed here.

The foot-operated brake module 1 contains, inter alia, a plunger 6 which is activated by a foot-operated service brake pedal (not illustrated) and which is axially movable in a housing 4. The plunger 6 has a spring plate 8 on which springs, in particular a helical compression spring arrangement 9, which can be composed, for example, of two helical springs located one inside the other, are supported, and which, on the other hand, are in turn supported at their opposite end on a valve piston 10 or relay piston 10 via an intermediate, plate-shaped element.

An actuating screw 11 which is screwed by its stem into a lower blind hole of the plunger 6 and arranged centrally and coaxially with respect to the spring means 9 is guided in an axially movable fashion with its screw head in a recess of the relay piston 10. When an axial movement of the plunger 6 occurs owing to activation of the foot-operated service brake pedal, the screw head of the actuating screw 11 moves within the recess of the relay piston 10.

The relay piston 10 activates in a known fashion a double-seat valve (not illustrated here for reasons of scale) in order to connect a working chamber of the foot-operated brake module either to a venting means (driving position) or to a supply connection (braking position), to which a supply pressure line which leads to a compressed air supply is connected. The working connection is then connected via a pneumatic pressure line of the pneumatic service brake circuit to a pneumatic connection of a pressure regulating module which connects the pneumatic service brake circuit further to pneumatic service brake cylinders via an integrated backup solenoid valve.

In addition, a travel measuring arrangement (for example, a contactless arrangement) which functions according to an inductive principle and forms a part of a signal input sensor, is arranged, in the region of a piston skirt of the plunger 6, for example with one or more travel measuring coils 12, connected in an electrically conductive fashion to evaluation electronics 14 arranged in a housing which is connected by flange to the housing 4 at a circumferential section.

The at least one travel measuring coil 12 encloses, in particular, the piston skirt of the plunger 6, the spring plate 8, the spring means 9 and the actuating screw 11 in an annular shape and is at the same time arranged in a positionally fixed fashion within the housing 4. The at least one travel measuring coil 12 can as a result be connected electrically to the electronics unit 14 without such connection itself being subject to a change in position.

A guide body 22 for the plunger 6, which at the same time forms a cover for the foot-operated brake module housing 4, is inserted from above into the foot-operated brake module housing 4 and centered there. An upper stop for the plunger 6 can then be formed by an end face section, arranged perpendicularly with respect to the axial direction of movement, of the spring plate 8.

In this context, the plunger 6, the spring plate 8, the spring means 9, the relay piston 10, the actuating screw 11 and the guide body 22 are arranged essentially coaxially, i.e. where appropriate with locally different shapes for structural reasons.

An upper end position of the plunger piston 6 which impinges on the guide body 22 marks the driving state with the released service brake. In the driving state the relay piston is lifted off a valve body, of the double-seat valve guided axially in the housing 4, and as a result compressed air can flow from the working connection into the vent via the working chamber, which results in venting of the pneumatic service brake circuit. The travel measuring coil 12 then generates in this context a corresponding (zero) service brake request signal.

If the driver then activates the foot-operated service brake plate with his foot starting from the driving state, the plunger 6 as a result moves axially downward, wherein this downwardly directed movement is transmitted via the spring 9 and, if appropriate, the actuating screw 11 to the relay piston 10 which then activates the double-seat valve in the ventilating position, as a result of which the pneumatic service brake circuit is aerated.

If the plunger skirt of the plunger 6 dips, owing to activation of the foot-operated service brake plate, more deeply in the axial direction into an opening in a coil body which supports the at least one travel measuring coil 12, the at least one inductive travel measuring coil 12 changes its inductance L, which can be detected by the evaluation electronics 14. The evaluation electronics 14 then form an electrical service brake request signal, proportional to the axial movement of the plunger 6, by use of a circuit integrated in the evaluation electronics 14, from the changed inductance L of the at least one travel measuring coil 12. The evaluation electronics 14 are connected via a digital interface to a communication line (not shown here), for example to a data bus to which a central electronic brake control unit of the electro-pneumatic service brake device is also connected, with the result that the electrical service brake request signal within the electrical service brake circuit is input into this electronic brake control unit. In the brake control unit, the service brake request signal can then be changed on an axial basis or wheel basis by use of relatively high functions such as, for example, automatic axle-load-dependent brake pressure regulation, differential slip regulation etc., before the signal is input into pressure regulating modules of the front axle or of the rear axle. In the pressure regulating modules, local control units are installed which then generate a brake pressure, dependent on the service brake request signal, in the associated pneumatic service brake cylinder or cylinders using an inlet/outlet solenoid valve combination, which pilot-controls a relay valve. The modulated actual brake pressure is then regulated by approximation of a setpoint brake pressure, represented by the service brake request signal, by a pressure sensor which is integrated in each case into such a pressure regulating module.

Without a switching device, such as, for example, a microswitch or a Hall sensor which closes an electrical circuit by formation of purely mechanical contacts even when the vehicle ignition system is switched off and which, when the vehicle ignition system is switched off, switches on or wakes up or activates electronic components which are in a switched-off state or in a standby mode, activation of the foot-operated service brake plate is sensed here even when the vehicle ignition system is switched off, using the at least one inductive travel measuring coil 12, which operates in a contactless fashion, in combination with the evaluation electronics 14.

Figure 3:
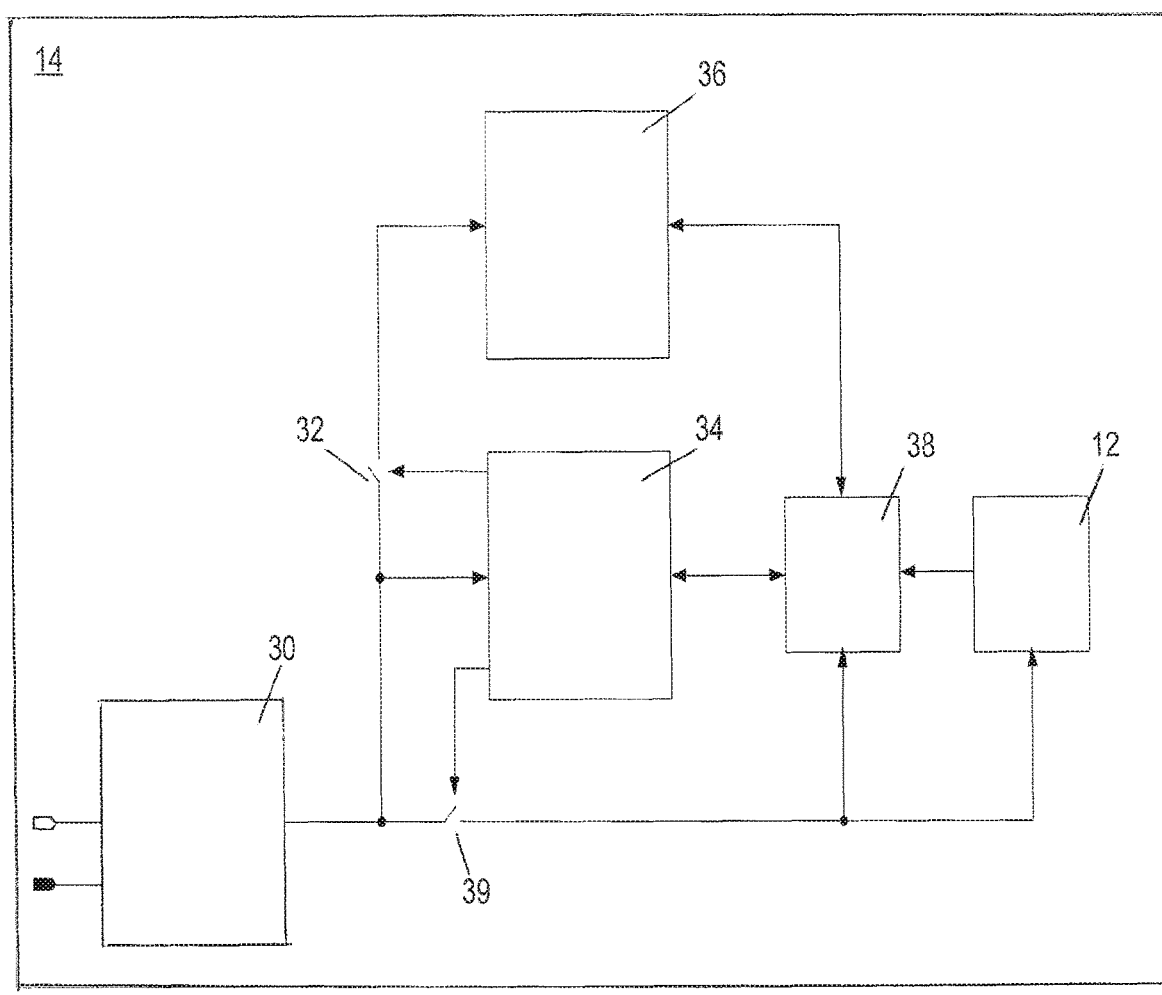
FIG. 3 shows a schematic circuit diagram of electrical and electronic components of the foot-operated brake module in FIG. 1.

For this purpose, as shown in FIG. 3, the travel measuring coil 12 and, for example, a first microprocessor 34 of two microprocessors 34 and 36 of the evaluation electronics 14 are preferably connected, even when the vehicle ignition system is switched off, to an electrical energy source, for example a vehicle battery with 24 V operating voltage, via a voltage regulator or voltage transformer 30, wherein the voltage transformer reduces the operating voltage from 24 V to 5 V, which voltage is then continuously present at the first microprocessor 34. The at least one travel measuring coil 12 and the second microprocessor 36 can, however, be connected to the voltage transformer 30 via electrical or electronic switches 32 and 39 which are preferably controlled via the first microprocessor 34.

Components assigned to the microprocessors 34 and 36, such as a data interface (A/D converter) and frequency divider are combined in each case in a separate block 38.

The consumption of electrical energy by the first microprocessor 34 is extremely low in the standby mode of the first microprocessor 34, with the result that when the vehicle ignition system is switched off the vehicle battery or the voltage transformer 30 only has to supply a very small current in order to maintain this standby mode.

In the evaluation electronics 14 and, in particular, in the first microprocessor a generator is preferably integrated which generates, in cycles or cyclically, an event signal which causes the evaluation electronics 14 to exit the standby mode in order to assume an energy-saving operating mode. While in the standby mode the evaluation electronics 14 in combination with the first microprocessor 34 are not able, owing to the then low flowing electrical current, to sense and evaluate a movement of the plunger 6 and therefore activation of the foot-operated service brake plate, this is, however, possible in the energy-saving operating mode.

Figure 2:
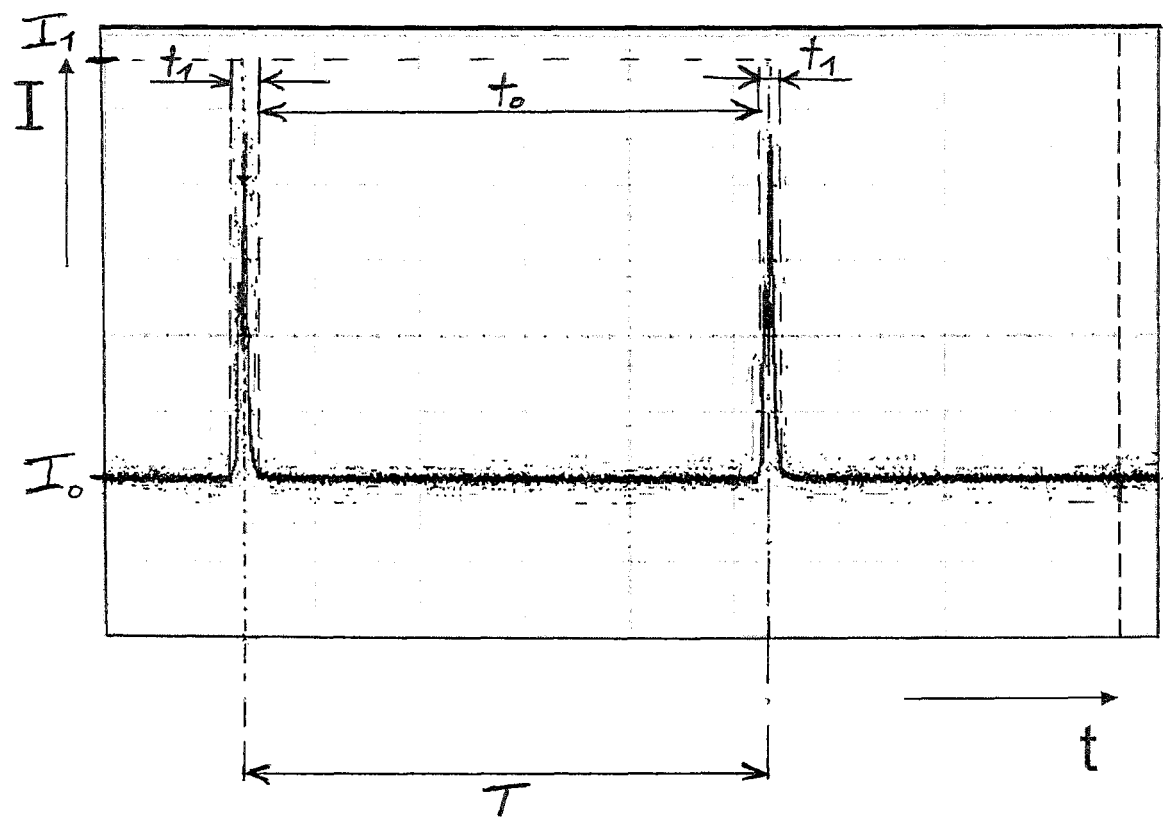
FIG. 2 shows a diagram of the consumption of current of a sensor device and of evaluation electronics of the foot-operated brake module in FIG. 1 plotted against the time.

FIG. 2 illustrates this cycle in which, owing to the event signal which is generated cyclically by the generator 34, the standby mode with relatively low current $I_0$ is exited at fixed, but preferably freely programmable, time intervals or a period T, and the energy-saving operating mode is assumed in which a substantially higher current $I_1$ flows through the first microprocessor 34 and the travel measuring coil 12. In this context, the time period $t_1$ during which the energy-saving operating mode is assumed and the current $I_1$ flows is preferably short compared to the time period $t_0$ during which the standby mode is assumed and the current $I_0$ flows, with the result that the relatively high current $I_1$ of the energy-saving operating mode flows only during the relatively short time period $t_1$. Because only a single microprocessor 34 of the two microprocessors 34 and 36 is also operated both in the standby mode and also cyclically in the energy-saving operating mode, the energy consumption in these modes is low.

The current $I_1$ which prevails in the energy-saving operating mode during the cyclically occurring time periods $t_1$ is particularly preferably lower than a current $I_2$ which flows through the travel measuring coil 12 and the evaluation electronics 14 in the usual operating mode when the ignition is switched on.

This cycle or the period T of this cycle or the time period $t_1$, in which the energy-saving operating mode is active, is dimensioned here in such a way that activation of the foot-operated service brake plate or of the plunger 6 can be sensed in any case, even if after a slight temporal delay. The maximum delay of the signal sensing and evaluation is then precisely one time the period T of a cycle.

The generator 34 is, for example, freely programmable with respect to the period T of the cycles of the event signal, the time period $t_1$ during which the energy-saving operating mode is assumed, and the time period $t_0$ during which the standby mode is assumed. In addition, the generator 34 can be designed in such a way that it can be calibrated cyclically by a reference time measuring source, in particular of the vehicle.

If the foot-operated service brake plate, and therefore also the plunger 6, are then activated by the driver, this process can be sensed and evaluated by the at least one travel measuring coil 12 and the first microprocessor 34 during the presence of the energy-saving operating mode within one of the cyclically present time periods $t_1$.

The first microprocessor 34 of the evaluation electronics 14 then particularly preferably also communicates with further electronic components of the electro-pneumatic service brake device such as, for example, the electronic brake control unit of the electro-pneumatic service brake device to the effect that when activation of the foot-operated service brake pedal is sensed in the energy-saving operating mode, a wakeup signal is generated for the brake control unit and for further electronic components such as, for example, the local electronic control units in the pressure regulating modules, in order to place these electronic components in an energy-saving operating mode or in a usual operating mode even when the ignition is switched off. Therefore, the electro-pneumatic service brake device is then preferably able to be used for the intended use, e.g. for service braking operations using the superordinate electrical service brake circuit.

During the switched-off state of the vehicle ignition system, the second microcontroller 36 of the evaluation electronics 14 is completely deactivated by the opened switch 32, i.e. it is non-energized. Only when the vehicle ignition system is switched on is the second microcontroller 36 of the evaluation electronics 14 placed in the usual operating mode in that the switch 32 is then closed by the first microprocessor 34 of the evaluation electronics 14. The electrical circuit in which the vehicle battery, optionally the voltage transformer 30 and the second microprocessor 36 are arranged, is then completed. When the vehicle ignition system is switched on, the first microprocessor 34 of the evaluation electronics 14 is also switched to its usual operating mode so that then continuous and redundant sensing and evaluation of the service braking request can be carried out by two microprocessors 34 and 36.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

1 Foot-operated brake module
2 Plunger
4 Foot-operated brake module housing
6 Plunger piston
8 Spring plate
9 Spring means
10 Relay piston
11 Actuating spring
12 Travel measuring coil
14 Evaluation electronics
22 Guide body
28 Housing part
30 Voltage transformer
32 Switch
34 first microprocessor
36 second microprocessor
38 Block
39 Switch

What is claimed is:

1. A vehicle brake system device, comprising:
a sensor device of a signal input device configured to
sense a degree of driver activation of an activation element between a position corresponding to non-activation of the activation element and a position corresponding to maximum activation of the activation element, and
generate an activation signal corresponding to the sensed degree of activation; and
evaluation electronics of the signal input device configured to
receive the activation signal generated by the sensor device, and
output a conditioned activation signal suitable for use by an electronic brake control unit configured to control generation of a brake pressure at brakes of the vehicle,
wherein at least one of the sensor device and the evaluation electronics is configured to
operate in a standby mode when a vehicle ignition system is in a switched-off state, the standby mode being a mode with reduced electrical energy consumption from an electrical energy source as compared to higher energy consumption in an operating mode when the vehicle ignition system is in a switched-on state, the reduced energy consumption being an amount of energy consumption lower than an amount of energy consumption required to operate the sensor device and the evaluation electronics to sense and evaluate the activation of the activation element, and
cyclically shift when the vehicle ignition system is in the switched-off state between the standby mode and an energy-saving operating mode in which energy consumption is high enough to operate the at least one of the sensor device and the evaluation electronics to sense and evaluate the activation of the activation element, wherein the cyclical shift between the standby mode and the energy-saving operating mode occurs continuously at a predetermined cycle period when the vehicle ignition system is in the switched-off state.

2. The vehicle brake system device as claimed in claim 1, wherein in the switched-off state of the vehicle ignition system and in the energy-saving operating mode the electrical energy which is consumed by the at least one of the sensor device and the evaluation electronics is less than or equal to the higher energy consumption in the operating mode when the vehicle ignition system is in a switched-on state.

3. The vehicle brake system device as claimed in claim 2, wherein the sensor device is configured to detect the activation of a component of the signal input device directly or indirectly activated by the activation element, and the component activation detection is contactless or involves contacts associated with the signal input device component.

4. The vehicle brake system device as claimed in claim 1, wherein the signal input device includes a generator configured to cyclically output at the predetermined cycle period an event signal to cause the at least one of the sensor device and the evaluation electronics to shift from the standby mode to the energy-saving operating mode.

5. The vehicle brake system device as claimed in claim 4, wherein over a predetermined time period when the vehicle ignition system is in the switched-off state the energy-saving operating mode is active during
a time period shorter than a portion of the predetermined time period the standby mode is active, or
a time period at least as long as the portion of the predetermined time period the standby mode is active.

6. The vehicle brake system device as claimed in claim 4, wherein the generator is integrated into the evaluation electronics.

7. The vehicle brake system device as claimed in claim 5, wherein the generator is programmed to set the time period to at least one of the predetermined time period, the time period during which the energy-saving operating mode is active, and the portion of the predetermined time period during which the standby mode is active.

8. The vehicle brake system device as claimed in claim 7, wherein the generator is configured to be calibrated cyclically relative to a reference time measurement source.

9. The vehicle brake system device as claimed in claim 1, wherein the evaluation electronics is configured to communicate with further electronic components of the signal input device such that when activation of the activation element is sensed in the energy-saving operating mode the evaluation electronics outputs a wake-up signal for shifting at least one of the further electronic components into its operating mode even when the ignition is switched off.

10. The vehicle brake system device as claimed in claim 9, wherein the at least one of the further electronic components is with at least one electronic open-loop or closed-loop control device of the vehicle system.

11. The vehicle brake system device as claimed in claim 1, wherein the evaluation electronics of the signal input device includes at least one microprocessor.

12. The vehicle device as claimed in claim 11, wherein the at least one microprocessor includes at least two microprocessors, and a first microprocessor of the at least two microprocessors which switched between the standby mode and the energy-saving operating mode in the switched-off state of the vehicle ignition system while a second of the at least two microprocessors is inactive until the vehicle ignition system is switched on.

13. The vehicle brake system device as claimed in claim 11, wherein at least one microcontroller of the evaluation electronics has a standby mode.

14. The vehicle brake system device as claimed in claim 1, wherein the at least one of the sensor device and the evaluation electronics is configured to operate with a voltage lower than a voltage of an electrical energy source of the vehicle.

15. The vehicle brake system device as claimed in claim 14, wherein the at least one of the sensor device and the evaluation electronics is configured to receive electrical energy via a voltage regulator or voltage transformer configured to decrease the voltage supplied by the electrical energy source of the vehicle.

16. The vehicle brake system device as claimed in claim 1, wherein signal input device is an electrical, electro-pneumatic or electro-hydraulic vehicle device.

17. The vehicle brake system device as claimed in claim 1, wherein
the signal input device is an electro-pneumatic or electrical service brake device of a vehicle having at least one electrical or electro-pneumatic service brake circuit containing a service brake pedal device with a foot-operated brake pedal as the activation element,
at least one electrical channel of the at least one electrical or electro-pneumatic service brake circuit includes the sensor device and the evaluation electronics, and
the sensor device directly or indirectly detects at least one of an activation travel and an activation angle of the foot-operated brake pedal.

18. The vehicle brake system device as claimed in claim 1, wherein the signal input device is
a parking brake device with a hand-operated device having a hand-operated activation element as the activation element or foot-operated device having a foot pedal as the activation element,
a clutch device with a clutch pedal-operated device having a clutch foot pedal as the activation element, or
an accelerator pedal device with an accelerator pedal-operated device having an accelerator foot pedal as the activation element.

19. A vehicle having the vehicle brake system device as claimed in claim 1.

* * * * *